April 14, 1931.  H. HOWARD  1,800,532
HYDROMETER FOR LIQUIDS
Filed Nov. 5, 1926   4 Sheets-Sheet 1

Inventor:
Henry Howard

By Byrnes Townsend & Breckenstein
his Attorneys.

April 14, 1931.  H. HOWARD  1,800,532
HYDROMETER FOR LIQUIDS
Filed Nov. 5, 1926  4 Sheets-Sheet 2

Inventor:
Henry Howard

By Byrnes Townsend & Bruckenstein
his Attorneys.

April 14, 1931. H. HOWARD 1,800,532
HYDROMETER FOR LIQUIDS
Filed Nov. 5, 1926 4 Sheets-Sheet 3

Inventor:
Henry Howard
By Byrnes Townsend & Buckenstein
his Attorneys.

April 14, 1931.  H. HOWARD  1,800,532
HYDROMETER FOR LIQUIDS
Filed Nov. 5, 1926  4 Sheets-Sheet 4
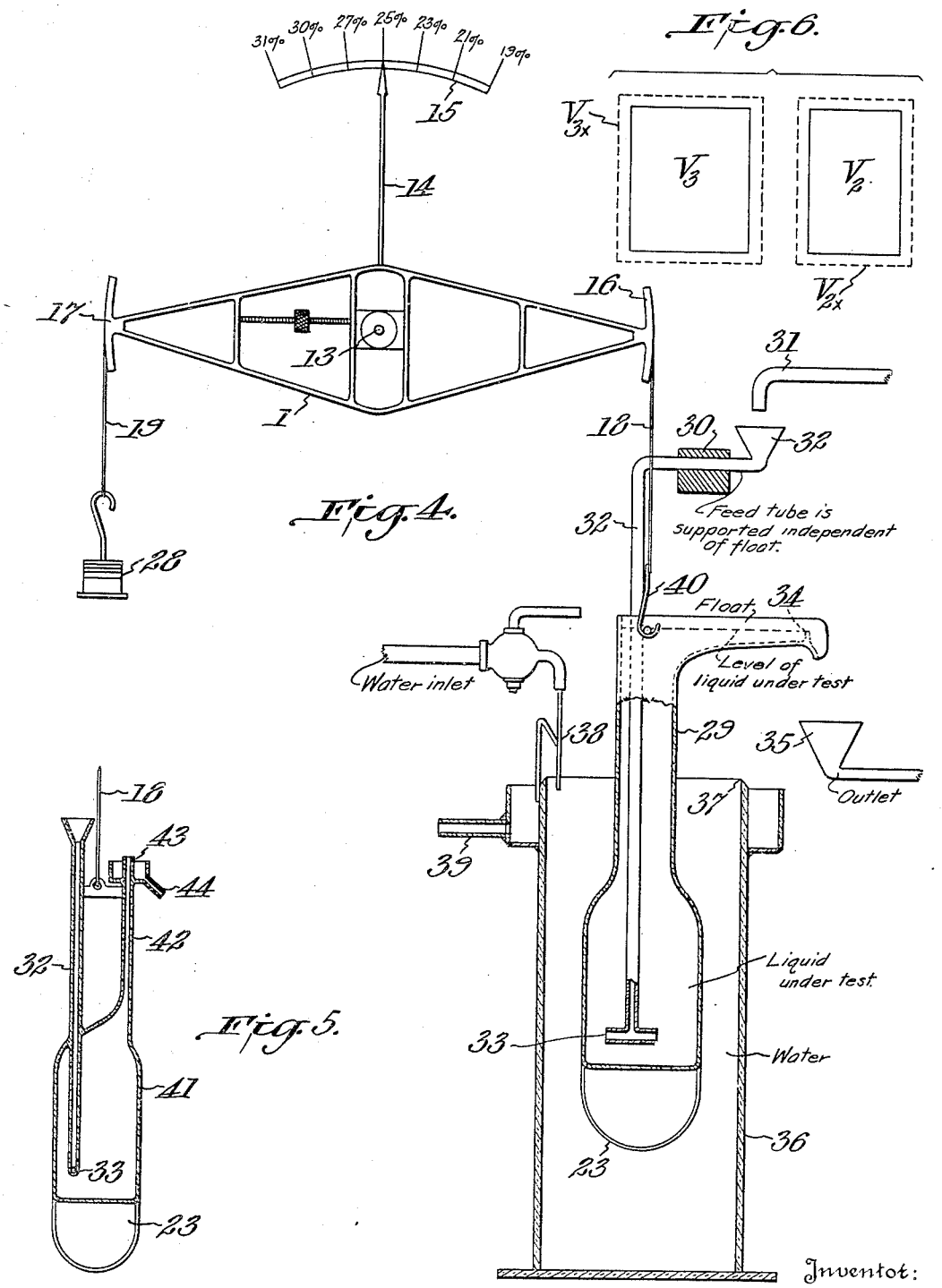

Patented Apr. 14, 1931

1,800,532

UNITED STATES PATENT OFFICE

HENRY HOWARD, OF CLEVELAND, OHIO, ASSIGNOR TO THE GRASSELLI CHEMICAL COMPANY, OF CLEVELAND, OHIO, A CORPORATION OF OHIO

HYDROMETER FOR LIQUIDS

Application filed November 5, 1926. Serial No. 146,543.

This invention relates to a device for indicating and recording the specific gravity of a liquid, and more particularly to a device adapted continuously to indicate and record slight changes in the specific gravity of a liquid.

Numerous attempts have been made to provide devices capable of indicating and recording variations in the density of a liquid by the use of an operable hydrometer element in conjunction with a device adapted to correct, automatically, the inaccuracy of the hydrometer reading due to changes in temperature of the liquid above or below that at which said hydrometer element was calibrated. While some devices of the character above described have been evolved, they have been found to be objectionable, due either to a lack of accuracy or to other inherent deficiencies.

One purpose of the present invention is to provide a device adapted continuously to indicate and record changes in the specific gravity of a liquid; which device is sensible to very slight changes in the density of the liquid and at all times accurately indicates and records the true specific gravity thereof.

I have found that if an hydrometer can be made to indicate the difference between the weight of a definite volume of water and that of a definite substantially equal volume of liquid to be tested, both liquids being at the same temperature, temperature corrections are not required in view of the fact that there is only a negligible variation in the coefficients of cubical expansion of water and of many other liquids. Also, I have found that if an hydrometer element be suspended from one arm of a balance beam,— which balance beam is pivoted about its center of gravity in such manner that the moment of its mass about said pivot is zero for any position of the beam, no mathematical correction for temperature change of the liquid being tested need be made provided that:

1. the hydrometer be made to indicate the difference between the weight of a definite volume of a second liquid, whose coefficient of cubical expansion is substantially the equivalent of that of the liquid being tested, and the weight of a definite volume of the liquid being tested, both of said liquids being at exactly the same temperature, or that 2. the change in temperature of the liquid being tested be made to effect a corresponding change in the moment exerted upon the arm of the balance, thus substantially counteracting the change in buoyancy of the liquid being tested due to change in the temperature of said liquid.

A specific object of the invention is to provide a device which is capable of indicating and recording continuously minute variations in the specific gravity of a liquid withdrawn from the source of production of that liquid, and which will find application in the estimation of the relative concentration or strength of the liquid.

For a full understanding of the invention reference is had to the accompanying drawings in which:

Fig. 4 is a view similar to Fig. 3, but showing another form of device embodying the invention;

Fig. 5 is a sectional view of a modified form of float for use in the embodiment of the invention illustrated in Fig. 4, and Fig. 6 is a diagrammatic representation of the relative volumes of two bodies of liquids at varying temperatures.

Figure 1:
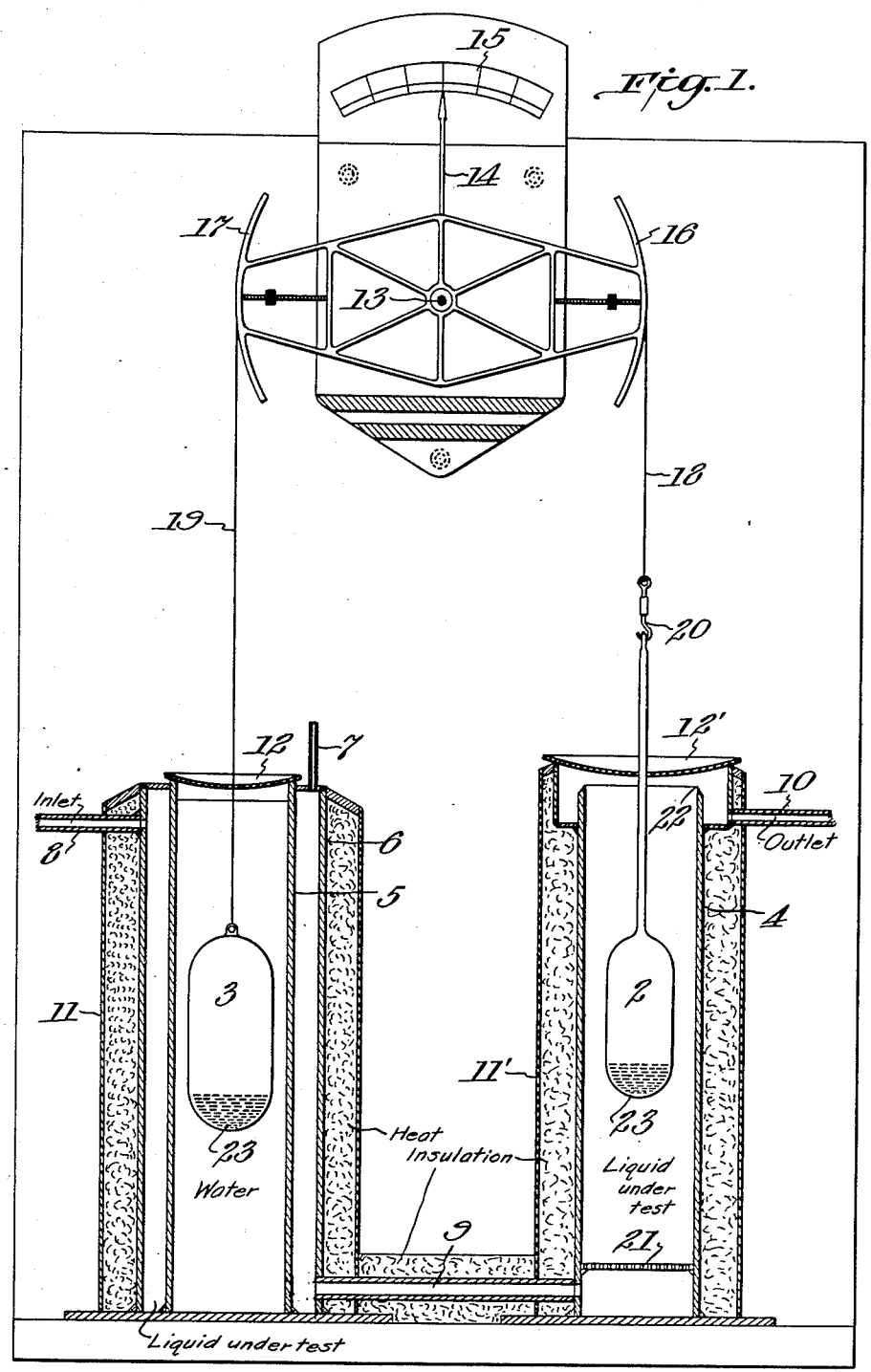
Fig. 1 is a vertical section through one form of device embodying the invention, as taken on line 1—1 of Fig. 2.

Referring to Fig. 1, 1 is a balance beam from the ends of which are suspended the hydrometer element or float 2 and the compensating float 3. 4 is a jar containing the liquid under test, and 5 is a jar containing water. The jar 5 is positioned within the closed jar 6, which is vented to the atmosphere at 7. 8, 9 and 10 are conduits for the liquid under test. The jars 4 and 6 preferably are thoroughly insulated by suitable insulating jackets 11 and 11′, and jars 4 and 5 may be covered by suitable covers 12 and 12′.

Balance beam 1 is pivoted about its center of gravity 13. It is equipped with a pointer 14 which is adapted to indicate density on the graduated scale 15. The beam ends 16 and 17 are arcs of the circle having a radius 13—16. From beam ends 16 and 17 are suspended the floats 2 and 3 by the suspension means 18 and 19. Thus the moment arms of the floats 2 and 3 are equal and constant at all times, and there is established the movement of floats 2 and 3 in fixed vertical lines. Suspension means 18 and 19 may be fine chains of a suitable metal, for example, gold. That portion of suspension means 19 which may come into contact with liquid should be in the form of a fine wire, to avoid the entrainment of drops of liquid in changing its vertical position. A turnbuckle, 20, is provided to facilitate the adjustment of float 2. Any possible variation in moment of the portions of the suspension means 18 and 19 in contact with the arcuated beam ends 16 and 17, resulting from a change in the angular position of the balance beam 1, is taken up by calibration of the scale 15. The use of fine chains at 18 and 19 substantially avoids the setting up of any torque in these suspension means resulting from a change in the relative positions of the floats 2 and 3.

In operation, a stream of the liquid under test flows through the inlet 8 into the space between jars 5 and 6, where a temperature equalization between the liquid under test and the water in jar 5 is effected, and thence, through the conduit 9, into the bottom of jar 4, through the grid 21 and overflows the knife edge 22 at constant level into outlet 10. The grid 21 effects the equalization of the upward flow of the liquid under test over the entire cross-sectional area of the jar 4, and minimizes any disturbing effect on the float 2.

The capacity of the jar 4 should be small so that any change in the specific gravity of the liquid supplied thereto will effect the position of the float 2 as quickly as possible. In this way the instrument will not lag behind the production by too great a time interval.

In order that the change in buoyancy of float 3, resulting from a change in the temperature of the body of water in jar 5, may be exactly equal to the change in buoyancy of float 2 from the same temperature change, the displacement of the float 3 must be made inversely proportional to that of float 2, depending upon the relative average density of the liquid under tests as compared with the water. Only in this way can complete automatic compensation for temperature changes be attained in the device disclosed.

In order to explain the above statement more fully, recourse is had to the following example, involving the application of the invention to the continuous determination of the specific gravity of a stream of oleum (fuming sulfuric acid).

Water and oleum have substantially the same positive temperature coefficient of cubical expansion, and hence a temperature-change in the specific gravity of the oleum is compensated for by a proportional corresponding temperature-change in the specific gravity of the water. Since the specific gravity of water is less than that of oleum at the same temperature the displacement of float 3 must be greater than that of float 2, in order that the change in buoyancy of float 3 resulting from temperature change may be exactly equal to the change in buoyancy of float 2 from the same temperature change.

In order to determine the exact ratio which should obtain between floats 2 and 3, the following case is assumed.

Referring to Fig. 6:

$V2$ = displacement float 2 } at a given
$V3$ = displacement float 3 } temperature 1.9 assumed sp. gy. oleum 1.0 sp. gy. water Suppose the floats to be removed.

$$\left.\begin{array}{l}\text{The liquid in space } V2 \text{ weighs } V2 \times 1.9 = 1.9\,V2 \\ \text{The liquid in space } V3 \text{ weighs } V3 \times 1.0 = V3\end{array}\right\} \quad (1)$$

Suppose both liquids to increase in temperature by the same amount. The coefficient of cubical expansion will be the same for both for this temperature change.

Let this coefficient be .001.

The liquid in the two cases assumes a new volume;

$$\left.\begin{array}{l}V2 \text{ becomes } V2_x = V2(1+.001) \\ V3 \text{ becomes } V3_x = V3(1+.001)\end{array}\right\} \quad (2)$$

Weight in the two cases does not change. Now replace the floats 2 and 3 in volumes $V2$ and $V3$. They will now displace weights of liquid equal to their volumes.

$$\text{From (1)} \left\{\begin{array}{l}\text{The liquid in space } V2 \text{ now weighs } \frac{V2}{V2x}\,1.9\,V2 \\ \text{The liquid in space } V3 \text{ now weighs } \frac{V3}{V3x}\,V3\end{array}\right\} \quad (3)$$

From (2), (3) becomes $$\left.\begin{array}{l}\left[\frac{V2}{V2(1+.001)}\right]1.9\,V2 = \frac{1.9\,V2}{1+.001} \\ \left[\frac{V3}{V3(1+.001)}\right]V3 = \frac{V3}{1+.001}\end{array}\right\} \quad (4)$$

The difference between the old and new weights is, from (1) and (4), $$\left.\begin{array}{l}1.9\,V2 - \frac{1.9\,V2}{1+.001} \\ V3 - \frac{V3}{1+.001}\end{array}\right\} \quad (5)$$

It is desired that these two weight changes shall be equal. If $V3 = 1.9\,V2$ (5) becomes $$\left.\begin{array}{l}V3 - \frac{V3}{1+.001} \\ V3 - \frac{V3}{1+.001}\end{array}\right\} \begin{array}{l}\text{as these expressions are the} \\ \text{same the assumption of} \\ V3 = 1.9\,V2 \text{ is correct}\end{array} \quad (6)$$

In other words, when the volume displaced by the two floats 2 and 3 is inversely proportional to the gravities, the buoyancy of the two floats is changed by an equal amount for each one for the same temperature change if the cubical coefficiency of expansion is alike. In the assumed case these conditions are fulfilled and temperature effects are completely compensated for.

As gravity of the oleum changes, the displacement of the oleum float 2 changes inversely with the gravity and therefore fulfills at all times the first condition of above paragraph thus permitting complete temperature compensation at all gravities.

The weights of the floats 2 and 3 in air should be exactly equal.

If floats 2 and 3 have weights exactly equal to their buoyancy the float 3 will be equilibrium at any position and the hydrometer float 2 will come to equilibrium like any other hydrometer when proper displacement is reached and its position will fix the position of the pointer, which position may be calibrated to correspond to acid strength. In the meantime the beam of the balance being suspended at its center of gravity will be in equilibrium at any position and does not affect the reading. In order to keep the wires or chains supporting the floats in a condition of permanent tension a substantially equal weight 23 is added to each float. These weights obviously will not affect the reading.

The float 3 is supported by a very fine wire so that its volume displacement is neglible compared to the volume displacement of the stem of the float 2. This will permit of the condition mentioned above, i. e., that the float 2 reaches equilibrium unaffected by the change in position of the float 3. It should be noted that the only function of the float 3 is to provide temperature compensation. If it were not for this temperature compensation the float 3 could be replaced by a counterweight. If a stem were used on float 3, it would offset the volumetric change of float 2 and greatly reduce the sensitivity besides interfering with the desired temperature correction.

The usual balance is constructed so that the center of gravity of the beam is slightly below the center of suspension so that the weight of the beam tends to restore the beam to the horizontal position. This condition is not necessary with a gravimetric acid indicator because the controlling force is not the weight of the beam, but the buoyancy of the float 2 which attains a position of equilibrium depending upon acid gravity, and does not require a horizontal beam for a determination. Therefore, the beam is balanced on its center of gravity and its position, likewise the position of pointer, determined by the degree of rise or fall of the float 2.

Figure 3:
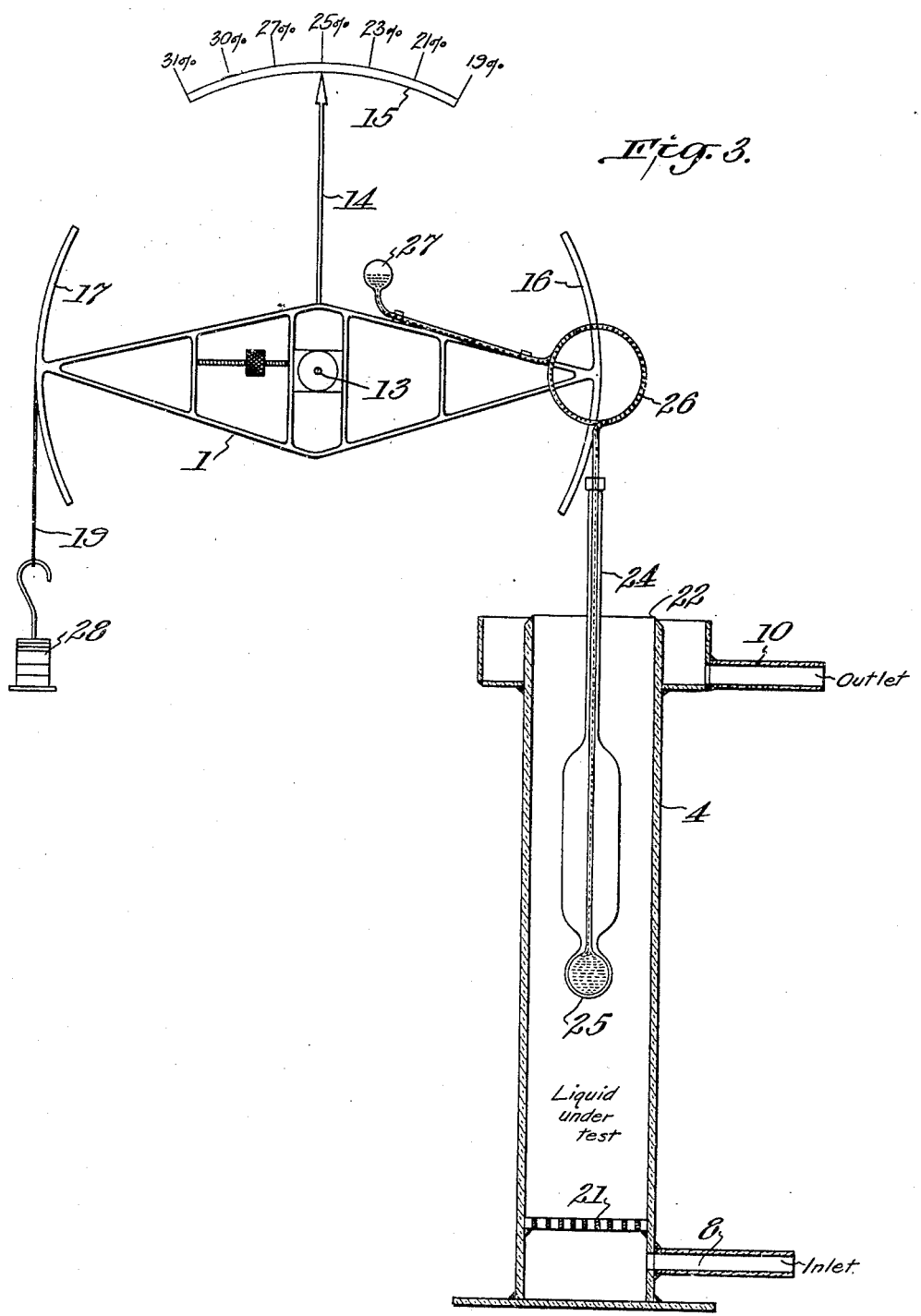
Fig. 3 is a sectional front elevation of another form of device embodying the invention.

I have found that an embodiment of the invention as illustrated by Fig. 3 of the accompanying drawings has substantially the same efficiency as that hereinbefore described. According to Fig. 3, 1 is a balance arm from one arcuate end 16 of which is suspended the float 24. From the other arcuate beam end 17 is suspended a counterweight 28 adjusted to counterbalance the weight of float 24. Float 24 is weighted with a body of a liquid, as for example, mercury 25, said body of liquid being connected by a spiral steel capillary tube 26 to the bulb 27 which is firmly attached to the balance beam 1. The float 24 is suspended in the jar 4 containing a constant volume of the liquid under test. The liquid under test enters the jar 4 through the inlet 8 at a point near the bottom of the jar 4, and flows through the grid 21, overflowing the knife edge 22 at the top of the jar 4 into the outlet 10.

When the temperature of the liquid under test rises, the apparent density of the liquid is lowered and the float 24 tends to sink. This causes an increase in the moment exerted by the float 24 on the beam 1. But the temperature increase causes an expansion of the body of mercury 25, forcing it into the bulb 27 and thereby decreasing the effective moment of the mercury. As the moment arm changes from the center line of the float 24 to a point nearer to the center line of bulb 27 temperature compensation is effected. The spiral 26 consists of several turns of steel capillary tube and tends to minimize the spring action between the beam 1 and the float 24 due to a change in angular position between the two, such as would result from a change in the specific gravity of the liquid under test. It is evident that the amount of mercury necessary to affect the temperature correction can be readily calculated. The beam 1 reaches equilibrium through the action of the float 24 which always tends to float at a point corresponding to the specific gravity of the liquid under test.

Figure 2:
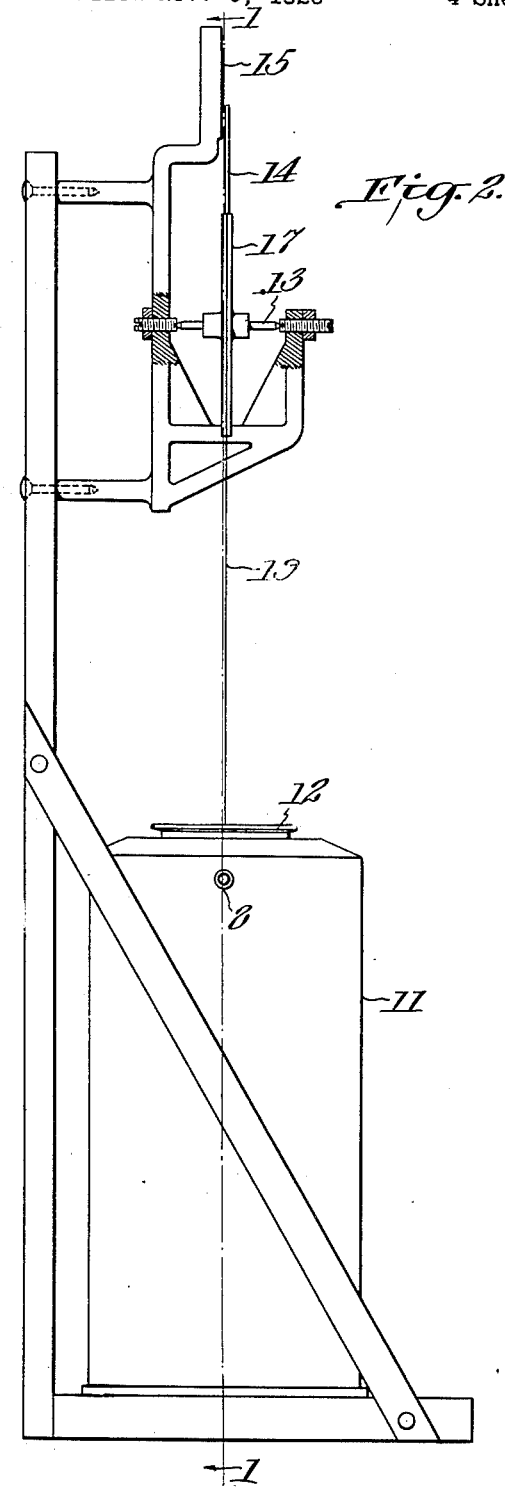
Fig. 2 is a partial sectional side elevation of the same embodiment.

Another embodiment of the invention is illustrated by Fig. 4, to which reference is had in the following description. From the arcuate beam ends 17 and 16 of balance arm 1 are suspended a counterweight 28 and a float 29. The balance is constructed as explained in the description of the device illustrated by Figs. 1 and 2. The float 29, suspended by the chain 18 and the hook 40, is constantly fed with liquid under test by means of the feed tube 32 which is supported independently of the float as by the support 30. The liquid in the float 29 is maintained at a constant level by means of a knife edge weir 34 over which the liquid overflows into outlet 35. The float 29 is suspended in the jar 36, which is filled with a second liquid as, for example, water. This second liquid is fed into the jar 36 in sufficient amounts only to maintain a constant level; it enters by running down the rod or wire 38 which prevents the flow from disturbing the surface, and overflows the knife edge 37 at the top of the jar to waste. The lower end of the feed tube 32 is T-shaped as shown at 33. This T-shaped end portion 33 causes the velocity of the liquid under test to be extended in a direction perpendicular to the axis of suspension and so prevents it from affecting the weight of the float 29.

For temperature corrections as explained before, the change in weight of the liquid under test must equal the change in buoyancy of the liquid. This may best be stated as follows; using as an illustration the determination of the true specific gravity of oleum:

Let $V3$=volume of oleum present in float 29
$V2$=volume of liquid displaced by float 29
Then $V2 = KV3$ where $K$ is constant
$1.9$=sp. gr. of oleum at $t_o$ degrees centigrade
$.00056$=coefficient of cubical expansion of oleum per degrees centigrade
$t$=the temperature change in degrees centigrade from $t_o$ degrees centigrade
$x$=sp. gr. of liquid at $t_o$ degrees centigrade
$y$=coefficient of cubical expansion of liquid per degrees centigrade Then the change in weight of the oleum in float $29 = V3(.00056)t1.9$. The change in buoyancy of the liquid $= V2\, xyt$.

$$V3(1.9).00056t = V2(x)yt$$
$$V3(1.9).00056 = KV3(xy)$$

$Kxy = 1.9(.00056)$ or the product of the specific gravity of oleum by the temperature coefficient of expansion must equal the product of the specific gravity of the liquid by its coefficient of expansion times the ratio of the displacements. The neck of the float 29 should be as small as good construction will permit in order to obtain maximum sensitivity. From the above equation it will be necessary to provide a volume of oleum in float 29 such that the change of weight resulting from the change in temperature will be equal to the change of buoyancy in the floating medium due to same temperature change. This is accomplished by having the volume of oleum inside of float 29 less than the volume of the supporting liquid (water) displaced by the float in the ratio of $1:1.9$.

It is to be understood that the volume of the liquid within the float 29 must be adjusted to the volume of the supporting liquid displaced by the float in inverse proportion to the densities of the supporting liquid and the liquid under test respectively.

Fig. 5 shows an alternative float for use with the apparatus described under Fig. 4. The liquid under test is fed by the feed tube 32, into the body of the float 41, and displaces the liquid therein through the neck 42, overflowing at a constant level over the knife edge 43 into the outlet 44. The float is suspended from the end of the balance beam by a wire 18. The float is so constructed that no air will be trapped. The feed tube 32 is T'd at the bottom as described in connection with Fig. 4. The construction with two necks permits the total area of the two necks to be less than the area of the neck on float 29, Fig. 4. The sensitivity is inversely proportional to the area of the neck.

The devices embodying the invention have been described as being capable of indicating the corrected specific gravity determination. These devices may be converted into recording instruments by adding a suitable mechanism which will cause the pointer 15 to record the variations in density with respect to time.

It is to be understood that the above-described devices may be caused to indicate and/or record the concentration or strength of the liquid under test, rather than the specific gravity thereof, by suitable graduation of the scale 11.

I claim:

1. In a specific gravity device for a liquid, a balance beam pivoted about its center of gravity in such manner that the moment of its mass about said pivot is zero for any position of the balance beam, and a hydrometer associated with said balance beam for continuously determining the density of a liquid and a compensator continuously neutralizing the effect of variations of temperature of said liquid upon said hydrometer.

2. In a specific gravity device for a liquid, a balance beam pivoted about its center of gravity in such manner that the moment of its mass about said pivot is zero for any position of the balance beam, and a hydrometer and a counterweight associated with said balance beam for continuously determining the difference between the weight of a definite volume of the liquid and the weight of a definite volume of a second liquid whose coefficient of cubical expansion is substantially equal to that of the first-mentioned liquid; both of said liquids being at the same temperature.

3. In a specific gravity device for a liquid, a balance beam pivoted about its center of gravity in such manner that the moment of its mass about said pivot is zero for any position of the balance beam, a hydrometer associated with one arm of said balance beam for continuously imparting thereto moment representative of the density of the liquid, and means associated with the other arm of said balance beam for continuously imparting thereto a counterbalancing moment representative of the density of a second liquid; both liquids being at the same temperature.

4. In a specific gravity device for a liquid, a balance beam pivoted about its center of gravity in such manner that the moment of its mass about said pivot is zero for any position of the balance beam, an hydrometer element suspended from one arm of said balance beam and floated in said liquid, a float suspended from the other arm of said balance beam and immersed in a second liquid whose coefficient of cubical expansion is substantially equal to that of the first-mentioned liquid, the ratios between the displacement volumes of said hydrometer element and said float being inversely proportional to the ratios between the apparent density of the first-mentioned liquid and the apparent density of the second mentioned liquid, indicating means associated with said balance beam, and means for maintaining the two liquids at the same temperature.

In testimony whereof, I affix my signature.

HENRY HOWARD.